(12) United States Patent
Chen et al.

(10) Patent No.: US 7,542,271 B2
(45) Date of Patent: Jun. 2, 2009

(54) MOUNTING APPARATUS FOR DATA STORAGE DEVICE

(75) Inventors: Yun-Lung Chen, Shenzhen (CN); Quan-Guang Du, Shenzhen (CN); Dong Qin, Shenzhen (CN); Li Tong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 273 days.

(21) Appl. No.: 11/309,051

(22) Filed: Jun. 14, 2006

(65) Prior Publication Data

US 2007/0246948 A1 Oct. 25, 2007

(30) Foreign Application Priority Data

Apr. 5, 2006 (CN) .................. 2006 2 0013422 U

(51) Int. Cl.
*H05K 5/00* (2006.01)
*H05K 7/00* (2006.01)
*A47B 96/00* (2006.01)
*A47K 1/00* (2006.01)
*A47K 5/00* (2006.01)

(52) U.S. Cl. ............................ 361/679.33; 248/221.11; 248/222.11

(58) Field of Classification Search ......... 361/679–686; 312/223.1, 223.2; 248/221.11, 222.11
See application file for complete search history.

(56) References Cited

U.S. PATENT DOCUMENTS

| 4,979,909 | A | 12/1990 | Andrews | |
|---|---|---|---|---|
| 6,272,008 | B1 * | 8/2001 | Huang | 361/683 |
| 6,445,663 | B1 * | 9/2002 | Chen et al. | 720/652 |
| 6,625,014 | B1 | 9/2003 | Tucker et al. | |
| 6,646,872 | B1 | 11/2003 | Chen | |
| 6,751,093 | B1 * | 6/2004 | Hsu et al. | 361/685 |
| 6,935,604 | B2 * | 8/2005 | Chen | 248/694 |
| 2004/0001308 | A1 * | 1/2004 | Yang | 361/685 |
| 2004/0114320 | A1 * | 6/2004 | Williams et al. | 361/685 |

* cited by examiner

*Primary Examiner*—Jayprakash N Gandhi
*Assistant Examiner*—Anthony M Haughton
(74) *Attorney, Agent, or Firm*—Wei Te Chung

(57) ABSTRACT

A mounting apparatus is provided for a data storage device defining a plurality of mounting holes. The mounting apparatus includes a bracket for accommodating the data storage device, a locking latch, and an action member. The bracket includes a side plate. The locking latch is elastically attached to the side plate of the bracket, for securing the data storage device in the bracket. A plurality of securing members is formed on the locking latch, corresponding to the mounting holes. The action member is attached to the side plate of the bracket. The action member includes a pair of elastic arms each having a fixed end and a free end. A pair of blocking members is respectively formed at the free ends, for securing the locking latch to the side plate of the bracket.

19 Claims, 3 Drawing Sheets

MOUNTING APPARATUS FOR DATA STORAGE DEVICE

FIELD OF THE INVENTION

The present invention relates to mounting apparatuses, and more particularly to a mounting apparatus for a data storage device of a computer system.

DESCRIPTION OF RELATED ART

A typical personal computer comprises data storage devices such as a hard disk drive (HDD), a floppy disk drive, and a compact disc-read only memory (CD-ROM) drive. Conventionally, the data storage devices are attached to a chassis of a computer enclosure using screws. A tool such as a screwdriver is required to fasten the screws, and to unfasten the screws when removing the data storage devices. The operations are laborious and time-consuming. Furthermore, even careful operators may cause the tool to slip, or may drop screws. When this happens, other internal components of the computer are liable to be damaged.

Nowadays, to allow convenient installation of a data storage device of a computer system, a pair of rails is typically provided. The rails are assembled to a pair of sidewalls of the data storage device, and then together inserted into a bracket of the computer system, between a pair of side plates of the bracket. However, the rails will increase space respectively between the sidewalls of the data storage device and the side plates of the bracket, thereby reducing EMI-proof (Electro Magnetic Interference, EMI) capability of the computer system.

What is needed, therefore, is a mounting apparatus with a simple structure for convenient installation and removal of a data storage device of a computer system.

SUMMARY OF THE INVENTION

A mounting apparatus is provided for a data storage device defining a plurality of mounting holes. The mounting apparatus includes a bracket for accommodating the data storage device, a locking latch, and an action member. The bracket includes a side plate. The locking latch is elastically attached to the side plate of the bracket, for securing the data storage device in the bracket. A plurality of securing members is formed on the locking latch, corresponding to the mounting holes. The action member is attached to the side plate of the bracket. The action member includes a pair of elastic arms each having a fixed end and a free end. A pair of blocking members is respectively formed at the free ends, for securing the locking latch to the side plate of the bracket.

Other advantages and novel features will be drawn from the following detailed description of preferred embodiments with attached drawings, in which:

DETAILED DESCRIPTION OF THE INVENTION

Figure 1:
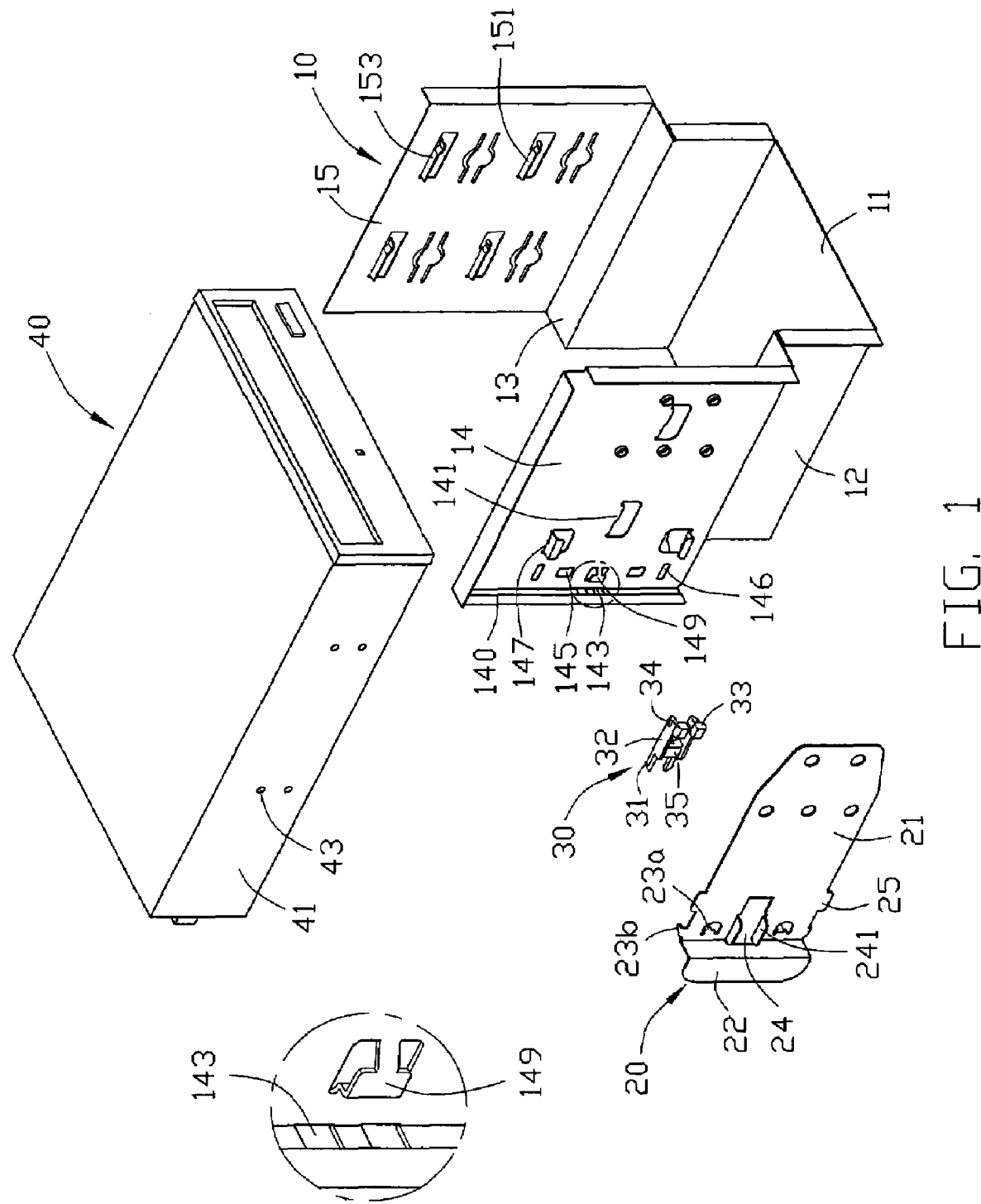
FIG. 1 is an exploded, isometric view of a mounting apparatus of a preferred embodiment of the present invention and a data storage device, the mounting apparatus including a receiving bracket, a locking latch, and an action member.

Referring to FIG. 1, a mounting apparatus of a preferred embodiment of the present invention is configured for securing storage devices 40, hereinafter one is shown and referred to. The data storage device 40 has a pair of sidewalls 41. A pair of mounting holes 43 is defined in each sidewall 41. In this preferred embodiment, the mounting apparatus includes a receiving bracket 10 for receiving the data storage device 40, a locking latch 20 for positioning the data storage device 40 in the bracket 10, and an action member 30.

The receiving bracket 10 includes a bottom plate 11, and a pair of first side plates 12 generally perpendicular to the bottom plate 26. A horizontal connecting wall 13 extends out from a top edge of each side plate 12, for supporting the data storage device 40. A pair of second side plates 14, 15 respectively extend up from a side edge of each of the connecting walls 13. A pair of supporting tabs 141, 151 parallel to each other is stamped in from a middle portion of the side plates 14 and 15, for supporting another data storage device 40. A pair of blocking tabs 153 is stamped in from the side plate 15 above the supporting tabs 151, for abutting on an upper surface of the data storage device 40 to limit a vertical movement thereof. An elastic tab 149 extends out from the side plate 14 at a middle portion near one edge of the side plate 14. A pair of vertically oriented generally rectangular shaped openings 145 is defined in the side plate 14, one just above the elastic tab 149 and one just below the elastic tab 149. Another pair of openings 146 horizontally oriented and rectangular shaped is also defined in the side plate 14, one just above the upper opening 145 and one just below the lower opening 145. The upper of the openings 145, 146 corresponding to the mounting holes 43 of the data storage device 40 and the lower of the openings 145, 146 corresponding to mounting holes of the another data storage device 40. A pair of limiting tabs 147 facing each other is stamped out from the side plate 14 beside the openings 146 for receiving a pair of blocking tabs 25 on the locking latch 20 respectively. A flange 140 having a pair of spaced securing slots 143 defined therein extends out from a side edge of the side plate 14.

The locking latch 20 includes a rectangular base plate 21. An L-shaped operating handle 22 extends out from a side edge of the base plate 21. An opening 24 is defined in a middle portion of the base plate 21 adjacent the operating handle 22 of the locking latch 20, corresponding to the elastic tab 149 of the side plate 14. Just above and just below the opening 24 a pair of vertical tabs 23a protrudes inward for being received in the openings 145 of the bracket 10 respectively. A pair of horizontal tabs 23b protrudes from a top edge and a bottom edge respectively of the latch 20 in vertical alignment with the tabs 23a and corresponding to the openings 146 of the side plate 14. A pair of wings 241 respectively extends out from an upper edge and a lower edge of the opening 24. A pair of blocking tabs 25 respectively protrudes from a top edge and a bottom edge of the base plate 21. One end of the locking latch 20 opposing to the handle 22 is secured to the receiving bracket 10 by rivets or screws, or other securing means known to a person skilled in the art.

Figure 2:
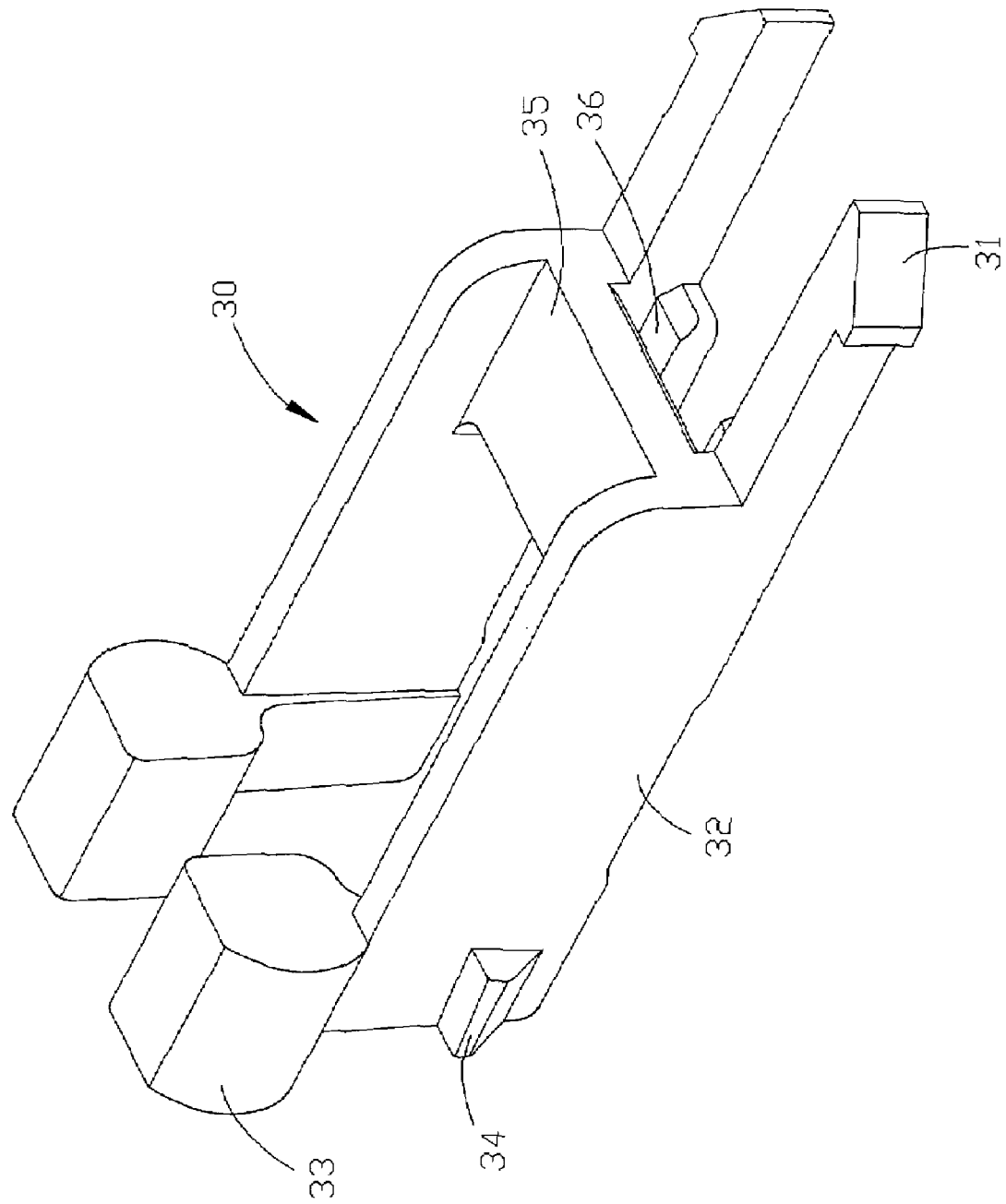
FIG. 2 is an isometric, enlarged view of the action member, but viewed from another aspect.

Referring also to FIG. 2, the action member 30 includes a pair of elastic arms 32 parallel to each other connected together near central portions thereof, by a connecting wall 35 to form a generally H-shaped pattern. A pair of hooks 31 respectively extends forward from first ends of the elastic arms 32, and a pair of securing protuberances 34 each with a sloped surface respectively protrudes from outer surfaces of second ends of the elastic arms 32. A pair of supporting tabs 36 extends oppositely from inner surfaces of the elastic arms 32 respectively, under the connecting wall 35. The connecting wall 35 and the supporting tabs 36 together form a receiving housing therebetween, for insertion of the elastic tab 149 of the receiving bracket 10. A pair of operating blocks 33 respectively protrudes up from top edges of the elastic arms 32 above the securing protuberances 34.

Figure 3:
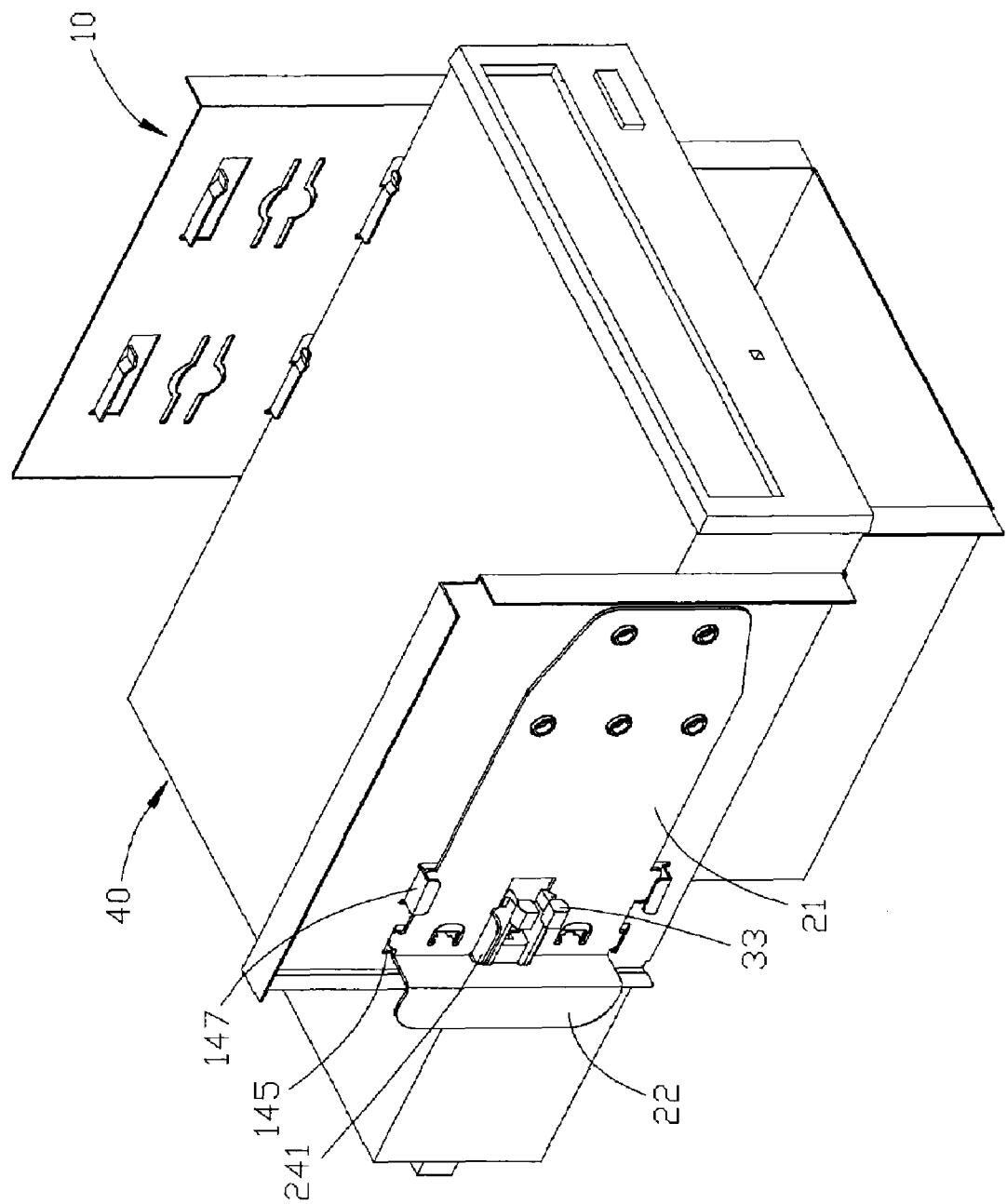
FIG. 3 is an assembled view of FIG. 1.

Referring also to FIG. 3, in assembly, the locking latch 20 is inserted along the limiting tabs 147 and secured to the side plate 14 of the receiving bracket 10. The securing members 23a, 23b of the locking latch 20 insert in the openings 145, 146 of the receiving bracket 10. The blocking tabs 25 of the locking latch 20 are aligned with and blocked by the limiting tabs 147, thereby preventing excessive movement of the locking latch 20 away from the side plate 14. The action member 30 is inserted into the opening 24 of the locking latch 20. The hooks 31 of the action member 30 engage with the securing slots 143 of the side flange 140 of the receiving bracket 14, and are thereby attached to the receiving bracket 10. The elastic arms 32 of the action member 30 respectively abut against the wings 241 of the locking latch 20, for restricting vertical movement of the action member 30. The elastic tab 149 is slidably received between the connecting wall 35 and the supporting tabs 36, thus preventing the action member 30 disengaging from the opening 24 of the locking latch 20. In an initial state, the sloped surfaces of securing protuberances 34 respectively block the top edge and bottom edge of the opening 24, thereby ensuring the securing members 23a, 23b of the locking latch 20 remain engaged with the openings 145, 146 respectively.

When the storage device 40 is assembled in the receiving bracket 10, first, the operating blocks 33 of the action member 30 are pressed toward each other. Thereby, the elastic arms 32 of the action member 30 are respectively deformed toward each other. The securing protuberances 34 of the action member 30 escape from the edges of the opening 24 of the locking latch 20, and retract between the locking latch 20 and the side wall 14 of the receiving bracket 10. Then, the operating handle 22 of the locking latch 20 is pulled outward in a direction away from the side wall 14 of the receiving bracket 10. Thus, the securing members 23a, 23b is removed away from the openings 145, 146. The storage device 40 is pushed along the connecting wall 13. When the mounting holes 43 of the storage device 40 are aligned with the openings 145 or 146, the handle 22 of the locking latch 20 is released. The securing members 23a, 23b of the locking latch 20 extend through the openings 145, 146 and engage with the mounting holes 43 of the storage device 40. The operating blocks 33 are pressed again, and the securing protuberances 34 are pulled out from the opening 24 of the locking latch 20. Then, the operating blocks 33 are released, the elastic arms 32 of the action member 30 rebound back. The securing protuberances 34 of the action member 30 respectively block on the top edge and bottom edge of the opening 24 inward again, urging the securing members 23 of the locking latch 20 to engage with the mounting holes 43 firmly.

In removing the data storage devices 40, press the operating blocks 33 of the action member 30 together first. When the securing protuberances 34 of the action member 30 escape from the edges of the opening 24 of the locking latch 20, the operating handle 22 of the locking latch 20 is pulled outward. The securing members 23a, 23b of the locking latch 20 disengage from the mounting holes 43 of the storage device 40. Then, the storage device 40 is pulled out from the receiving bracket 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting assembly, comprising:
    a data storage device, at least one mounting hole defined in the data storage device;
    a bracket for accommodating the data storage device, the bracket comprising a side plate;
    a locking latch having a base plate being parallel to the side plate of the bracket being elastically attached to the side plate of the bracket for securing the data storage device in the bracket, at least one securing member corresponding to the mounting hole formed on the locking latch; and
    an action member attached to the side plate of the bracket, the action member comprising a first end engaged to the side plate and a second end opposite to the first end, at least one blocking member formed at the second end configured to abut against the locking latch and urge the locking latch to move toward the side plate of the bracket so that the securing member of the locking latch extends through the side plate of the bracket to engage in the mounting hole in the data storage device, and the second end being deformable to release the at least one blocking member from the locking latch.

2. The mounting assembly as described in claim 1, wherein an opening is defined in the locking latch, the action member comprises a pair of elastic arms parallel to each other formed at the second end, a connecting wall connecting the elastic arms together, the at least one blocking member comprises two blocking members respectively formed on the elastic arms andengaged with an edge of the opening.

3. The mounting assembly as described in claim 2, wherein a pair of wings respectively extend from edges of the opening, the elastic arms of the action member respectively abut against the wings.

4. The mounting assembly as described in claim 2, wherein a pair of hooks respectively protrude from the first ends of the elastic arms, and a side flange defining a pair of slots corresponding to the hooks extends from a side edge of the side plate of the bracket.

5. The mounting assembly as described in claim 2, wherein a pair of supporting tabs extend oppositely from inner sides of the elastic arms under the connecting wall, an elastic tab extending from the side plate of the bracket is inserted between the supporting tabs and the connecting wall.

6. The mounting assembly as described in claim 2, wherein a pair of operating blocks respectively protrude from the elastic arms.

7. The mounting assembly as described in claim 1, wherein a pair of opposite limiting tabs respectively extend from the side plate of the bracket, a pair of blocking tabs corresponding to the limiting tabs respectively protrude from the locking latch.

8. The mounting assembly as described in claim 1, wherein the locking latch comprises a fixed end attached to the side plate of the bracket and a free end opposing to the fixed end, an L-shaped operating handle extending from the free end of the locking latch, the at least one securing member being formed adjacent to the handle.

9. A mounting assembly, comprising:
    a data storage device, at least one mounting hole defined in the data storage device;
    a bracket for accommodating the data storage device, the bracket comprising a side plate;
    a locking latch having a base plate being parallel to the side plate of the bracket, and attached to the side plate of the bracket for securing the data storage device in the bracket, the locking latch comprising a free end, at least one securing member corresponding to the mounting hole formed at the free end, an opening defined in the locking latch adjacent the securing member; and an action member attached to the side plate of the bracket, the action member comprising at least one elastic arm having a first end sandwiched between the side plate of the bracket and the locking latch and engaged with the side plate and a second end extending out from the opening of the locking latch, a blocking member formed at the second end abutting against an edge of the opening configured for urging the free end of the locking latch to attach to the side plate of the bracket, whereby the securing member firmly engages in the mounting hole of the data storage device.

10. The mounting assembly as described in claim 9, wherein the action member comprise a pair of elastic arms parallel to each other, a connecting wall connecting the elastic arms together.

11. The mounting assembly as described in claim 10, wherein a pair of wings respectively extend from edges of the opening, the elastic arms of the action member respectively abut against the wings.

12. The mounting assembly as described in claim 10, wherein a pair of hooks protrude from the first end of the elastic arms, a side flange defining a pair of slots corresponding to the hooks extending from a side edge of the side plate of the bracket.

13. The mounting assembly as described in claim 10, wherein a pair of supporting tabs extend oppositely from an inner side of the elastic arms, under the connecting wall, an elastic tab extending from the side plate of the bracket is inserted between the supporting tabs and the connecting wall.

14. The mounting assembly as described in claim 10, wherein a pair of operating blocks respectively protrude from the elastic arms.

15. The mounting assembly as described in claim 9, wherein a pair of opposite limiting tabs extend from the side plate of the bracket, and a pair of blocking tabs abutting the limiting tabs respectively protrude from edges of the locking latch.

16. The mounting assembly as described in claim 9, wherein an L-shaped operating handle extends from a free end of the locking latch.

17. A mounting assembly for a data storage device, the mounting assembly comprising:

a bracket configured for accommodating the data storage device, the bracket comprising a side plate;

a locking latch having a base plate being parallel to the side plate of the bracket attached on an outside of the side plate, the locking latch comprising a fixed end securely attached to the side plate and a free end being movable relative to the side plate, at least one securing member formed at the free end for extending through the side plate to engage with the data storage device; and an action member attached to the side plate of the bracket, the action member comprising an elastic arm having a free end, a blocking member formed at the free end of the elastic arm and abutting against the free end of the locking latch toward the side plate, whereby the securing member firmly engages with the data storage device.

18. The mounting assembly of claim 17, wherein the locking latch defines an opening at which the blocking member abuts against the locking latch.

19. The mounting assembly of claim 18, wherein the action member further comprises an additional elastic arm at which an additional blocking member is formed, the elastic arms being squeezed between opposite edges of the opening and capable of being further squeezed toward each other to cause the blocking member to disengage from the locking latch.

* * * * *